(12) United States Patent
Ochi et al.

(10) Patent No.: US 6,556,776 B1
(45) Date of Patent: Apr. 29, 2003

(54) DIGITAL SIGNAL RECORDING/REPRODUCING APPARATUS

(75) Inventors: Atsuo Ochi, Moriguchi (JP); Hirofumi Nakagaki, Kadoma (JP); Kenji Morimoto, Neyagawa (JP); Naoshi Usuki, Yawata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/214,863

(22) PCT Filed: May 12, 1998

(86) PCT No.: PCT/JP98/02084
§ 371 (c)(1),
(2), (4) Date: Jan. 13, 1999

(87) PCT Pub. No.: WO97/00579
PCT Pub. Date: Jan. 3, 1997

(30) Foreign Application Priority Data

May 13, 1997 (JP) .............................................. 9-121976

(51) Int. Cl.⁷ .............................. H04N 5/91; H04N 8/00
(52) U.S. Cl. ......................................... 386/124; 386/46
(58) Field of Search ................................. 386/124, 109, 386/111, 112, 27, 33, 123, 46, 40, 37, 92, 95, 21, 35; H04N 5/91, 7/00

(56) References Cited

U.S. PATENT DOCUMENTS 5,335,116 A * 8/1994 Onishi et al.
5,548,410 A * 8/1996 Kim et al.

FOREIGN PATENT DOCUMENTS

| JP | 9-83953 | 3/1997 |
| JP | 9-186665 | 7/1997 |
| JP | 9-200693 | 7/1997 |
| JP | 9-233428 | 9/1997 |
| JP | 9-326993 | 12/1997 |
| WO | WO 97/00579 | 1/1997 |
| WO | WO 97/10678 | 3/1997 |

OTHER PUBLICATIONS

Supplementary Eurropean Search Report for corresponding EP Application No. 98 91 9558 Dated Oct. 30, 2002.
Japanese language search report for Int'l Appln No. PCT/JP98/02084 dated Aug. 18, 1998.
English translation of Japanese language search report.

* cited by examiner

Primary Examiner—Robert Chevalier
(74) Attorney, Agent, or Firm—RatnerPrestia

(57) ABSTRACT

A digital signal recording and reproducing apparatus has the following components: a digital information decoding circuit for outputting (a) a received digital information signal by selecting a channel, and (b) a first analog signal by selecting and decoding either one of a selected digital information signal, and a reproduced digital information signal of a recording medium; a recording and reproducing unit for outputting a reproduced digital signal, comprising (a) a digital signal recording unit for inputting the digital information signal of the channel selected and output by the digital information decoding circuit, and for recording on the recording medium, (b) a digital signal reproduction unit for reproducing the digital signal recorded on the recording medium, and (c) a first recording and reproduction unit for recording and reproducing an externally input analog video/audio signal on the recording medium as a second analog signal; a bus line for transmitting (a) the digital information signal of the channel selected and output by the digital information decoding circuit to the recording and reproducing unit, and (b) a digital information signal output by the recording and reproducing unit to the digital information decoding circuit; and an analog information selecting circuit for selecting and outputting either one of (a) the first analog signal decoded by the digital information decoding circuit, and (b) the second analog signal reproduced by the recording and reproducing unit.

6 Claims, 4 Drawing Sheets

DIGITAL SIGNAL RECORDING/REPRODUCING APPARATUS

This Application is a U.S. National Phase Application of PCT International Application PCT/JP98/02084.

FIELD OF THE INVENTION

The present invention relates to an apparatus for receiving, recording and reproducing digital video and audio information served through satellite broadcasting, and, more particularly, to a digital signal recording and reproducing apparatus which is compatible with the currently available analog recording method.

BACKGROUND OF THE INVENTION

At the present, digital satellite broadcasting services have been started in the United States as its beginning in Japan and in Europe. In digital satellite broadcasting of this kind, high picture quality, high sound quality and channel multiplexing have been realized by substantially compressing an amount of information signal containing video signal and audio signal with a digital signal compression technique. Also, decoders for decoding transmitted digital information signals into analog format video signals and audio signals have been spreading rapidly.

At the same time, recording methods of the digital signal such as DVC (Digital Video Cassette), DVHS (Digital VHS), etc. are in progress or practical use, in addition to analog recording methods of the currently existing VHS format, SVHS format, etc. as the home use VTR (Video Tape recorder), so as to realize a recording of the video and audio signals for a long period of time without deterioration. Moreover, specifications of digital interface have also been studied in order to transmit signals at a high speed without deterioration among those digital apparatus, and they are now in a process of standardization with the IEEE standard 1394 (IEEE: The Institute of Electrical and Electronics Engineers, Inc.), for example.

Amid these developments, recordings with a higher picture quality and a longer time than the analog signal recording methods of the prior art have come to a reality with a decoder capable of receiving digital satellite broadcastings and a VTR of a digital signal recording method connected via a digital interface.

One example of connecting such digital apparatus of the prior art is shown in FIG. 4.

In FIG. 4, a decoder 35 receives a digital satellite broadcasting, and decodes it into analog video/audio signal. A VTR 36 is a recording and reproducing apparatus for recording and reproducing analog video/audio signals, e.g., analog signals in the VHS format, etc., fed in through an input terminal 40, and also recording and reproducing digital signals, e.g., digital signals in the DVHS format, etc., fed in through an input/output terminal 41. A TV monitor 11 is a monitor for displaying images and producing sounds by inputting analog video/audio signals output from the decoder 35 and analog video/audio signals output from the VTR 36, and it has two input terminals 43 and 44.

The decoder 35 is provided with an input terminal 37, an output terminal 38 and an input/output terminal 39. The input terminal 37 inputs received digital video/audio signals, and the output terminal 38 outputs decoded analog video/audio signals. Also, the input/output terminal 39 is a digital interface terminal for the decoder 35 to exchange digital signals with other apparatus.

In the VTR 36, the external input terminal 40 is for inputting analog video/audio signals, an output terminal 42 is for outputting reproduced analog video/audio signals, and the input/output terminal 41 is a terminal for digital interface.

An output signal of the decoder 35 is fed to the first input terminal 43 of the TV monitor 11, and an output signal of the VTR 36 is input to the second input terminal 44 of the TV monitor 11. In viewing images and sounds by receiving a digital broadcasting program, the TV monitor 11 inputs analog video/audio signals from the output terminal 38 via the input terminal 43, and outputs images and sounds of the program.

Also, when recording a particular information received and selected among digital broadcasting programs, the VTR 36 records digital signals of the images and sounds with a digital signal recording method by connecting the decoder 35 and the VTR 36 with a cable for the digital interface. When reproducing digitally recorded signals, the decoder 35 reads the digital signals from the VTR 36 via the digital interface, decodes them into analog video/audio signals within the decoder 35, and outputs the analog video/audio signals from the output terminal 38. Then, the TV monitor 11 inputs the output signals through the input terminal 43 of the TV monitor 11, and displays the images and produces the sounds.

Next, when a ground wave broadcasting, etc. is received, analog video/audio signals are input from a tuner (not shown in the figure) via the input terminal 40, and they are recorded in a magnetic tape with an analog signal recording method such as the VHS format. When the magnetic tape, recorded in the analog format as above, is played-back with the VTR 36, the video/audio signals are output from the output terminal 42, they are then fed to the input terminal 44 of the TV monitor 11, and the TV monitor 11 displays the images and produces the sounds.

As described, the TV monitor 11 inputs analog signals from the first input terminal 43, when receiving and viewing a digital broadcasting, and when reproducing and viewing recorded digital video/audio signals with the VTR 36. Also, when reproducing analog video/audio signals recorded in the existing VHS format, etc., the TV monitor 11 inputs the analog signals from the second input terminal 44.

Accordingly, a viewer must switch an input to the monitor, when receiving and viewing a digital broadcasting, and when reproducing and viewing recorded digital video/audio signals with the VTR 36, or when reproducing analog video/audio signals recorded in the existing VHS format, etc.

One of the reasons for necessitating two input terminals on the TV monitor is that it is not desirable, in view of concern about a copyright, is to provide a condition allowing a digital signal to be taken out of a decoder in a form of easily decodable digital signal. In other words, a digital signal output from the decoder 35 via the digital interface shall not be an easily decodable digital signal. Hence, the decoder for digital broadcasting must decodes digital information signal it inputs, and outputs it as an analog signal. Also, when utilizing other recording apparatus for digital signals, the digital signals shall not be easily decodable signals.

For the above reason, if a decoder for digital broadcasting and a VTR for digital broadcasting having a compatibility with the existing analog recording method are composed separately, an input for the TV monitor must be switched every time when receiving and viewing a digital broadcasting, and when reproducing and viewing signals recorded with the existing analog recording method such as the VHS format, etc. It is especially annoying for an elderly viewer not familiar with manipulation of the audio/video apparatus to switch a source of audio/video signals by using a selector. Moreover, the viewer is afflicted even more with this problem, if the TV monitor is equipped only with one input terminal. Therefore, it is desirable to make audio/video apparatus capable of outputting a program, which is determined as what is desired to watch, to a TV monitor without requiring a switching manipulation.

The present invention is derived in consideration of the above-described problem of the prior art, and it aims at realizing a digital signal recording and reproducing apparatus, which is capable of providing an enjoyment of receiving new services of the digital broadcasting without necessitating to switch an input of a TV monitor, and viewing and listening to images and sounds that is recorded with the existing analog recording method such as the VHS format.

Although the VTR 36 records a signal fed through the input terminal 40 in the analog format, an input of the TV monitor 11 must be switched, even when it digitally records input analog video/audio signals by compressing them such as with the DVC. While the VHS format has been described as an analog recording method, a switching manipulation is also necessary in the same manner even with other analog recording methods such as the SVHS format, the β format, etc.

SUMMARY OF THE INVENTION

A digital signal recording and reproducing apparatus of the present invention has a digital information decoding circuit for outputting (a) a digital information signal of a channel selected among those received, and (b) a first analog signal by selecting and decoding one of a selected digital information signal, and a reproduced digital information signal of a recording medium. A recording and reproducing unit is provided for outputting a reproduced digital signal, and includes (a) a digital signal recording unit for inputting a digital information signal of the channel selected and output by the digital information decoding circuit, and for recording on a recording medium, (b) a digital signal reproduction unit for reproducing the digital signal recorded on the recording medium, and (c) a first recording and reproduction unit for recording and reproducing an externally input analog video/audio signal on the recording medium as a second analog signal. Over a bus line is transmitted (a) the digital information signal of the channel selected and output by the digital information decoding circuit to the recording and reproducing unit, and (b) the digital information signal output by the recording and reproducing unit to the digital information decoding circuit. An analog information selecting circuit selects and outputs either one of (a) the first analog signal decoded by the digital information decoding circuit, and (b) the second analog signal reproduced by the recording and reproducing unit.

DETAILED DESCRIPTION OF THE INVENTION

A digital signal recording and reproducing apparatus of an exemplary embodiment of the present invention is described hereinafter by referring to FIG. 1 through FIG. 3.

Figure 1:
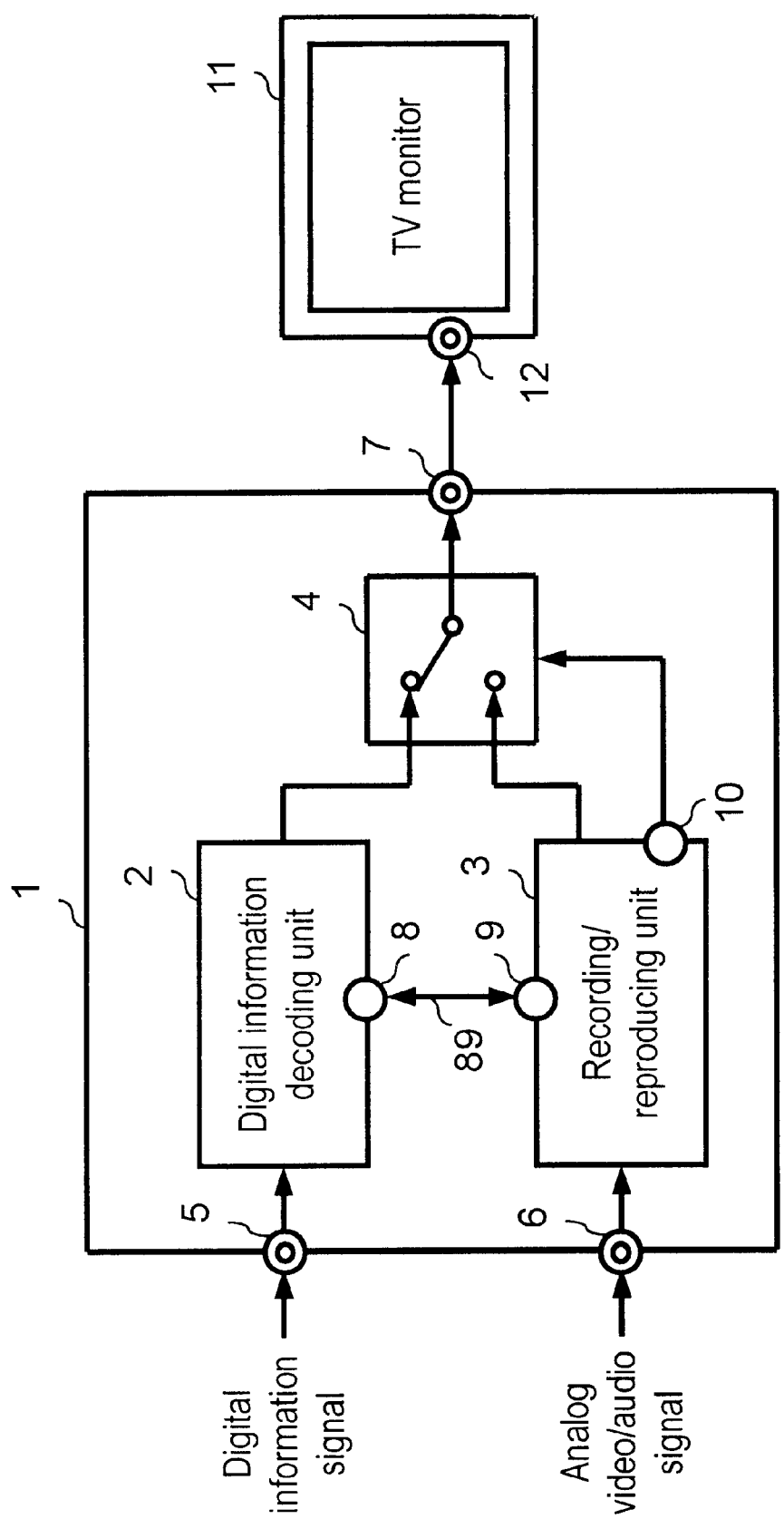
FIG. 1 is a block diagram depicting an overall structure of a digital signal recording and reproducing apparatus of an exemplary embodiment of the present invention.

In FIG. 1, the digital signal recording and reproducing apparatus 1 comprises a digital information decoding unit 2, a recording and reproducing unit 3, and a selecting unit 4, and it outputs a video/audio signal to a TV monitor 11 via an output terminal 7.

The digital information decoding unit 2 decodes a digital information signal it receives via an input terminal 5, and outputs the output signal to the selecting unit 4 as a first analog video/audio signal. In here, the "digital information signal" it receives means a signal, for which a digital information service signal, etc. in broadcasted or transmitted teletext, etc., beside a video signal and an audio signal, are collectively called.

The recording and reproducing unit 3 records an analog video/audio signal fed through an input terminal 6 as an analog signal with a second recording method, reproduces the signal, and outputs the output signal to the selecting unit 4 as a second analog video/audio signal.

Further, the digital information decoding unit 2 and the recording and reproducing unit 3 are connected with a bus line 89 between an input/output terminal 8 and an input/output terminal 9.

The digital signal recording and reproducing apparatus 1 transfers a digital signal from the digital information decoding unit 2 to the recording and reproducing unit 3 via the bus line 89, and records the digital signal as it is on a recording medium by a first recording method, when recording the digital video/audio signal.

Also, the digital signal recording and reproducing apparatus 1 reads the digital signal from the recording medium in the recording and reproducing unit 3, outputs the digital signal to the digital information decoding unit 2 via the input/output terminal 9 and the bus line 89, decodes it with a decoder in the digital information decoding unit 2, and sends an output to the selecting unit 4, when reproducing the digital video/audio signal.

The recording and reproducing unit 3 is provided with a first recording and reproducing unit for recording and reproducing analog signals, and a second recording and reproducing unit for recording and reproducing digital signals.

The selecting unit 4 defines an analog information selecting unit for switching between the first analog video/audio signal output by the digital information decoding unit 2 and the second analog video/audio signal output by the recording and reproducing unit 3. An output of the selecting unit 4 is supplied to an input terminal 12 of the TV monitor 11 via an output terminal 7.

Further, the recording and reproducing unit 3 examines a signal recorded on the recording medium to distinguish between an analog recording method and a digital recording method, and outputs a recording method identification signal from an output terminal 10.

As has been described, the digital signal recording and reproducing apparatus 1 is constituted so as to output an analog video/audio signal of one system selected by the selecting unit 4 via the output terminal 7.

The digital information decoding unit 2 and the recording and reproducing unit 3 of the digital signal recording and reproducing apparatus 1 are hereinafter described in details by referring to FIG. 2 and FIG. 3 respectively.

Figure 2:
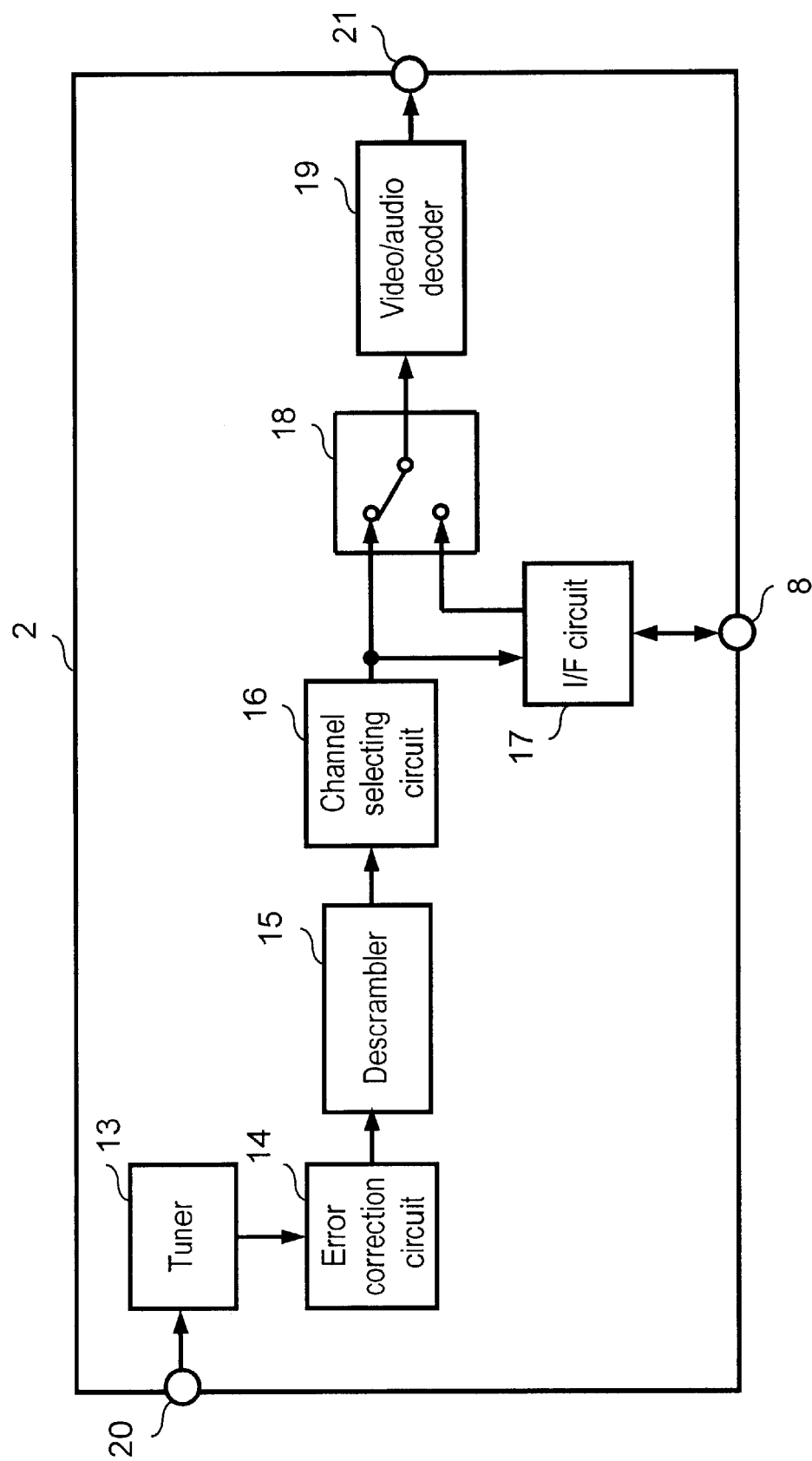
FIG. 2 is a block diagram depicting an internal structure of a digital information decoding unit of the digital signal recording and reproducing apparatus of the present invention.
Figure 3:
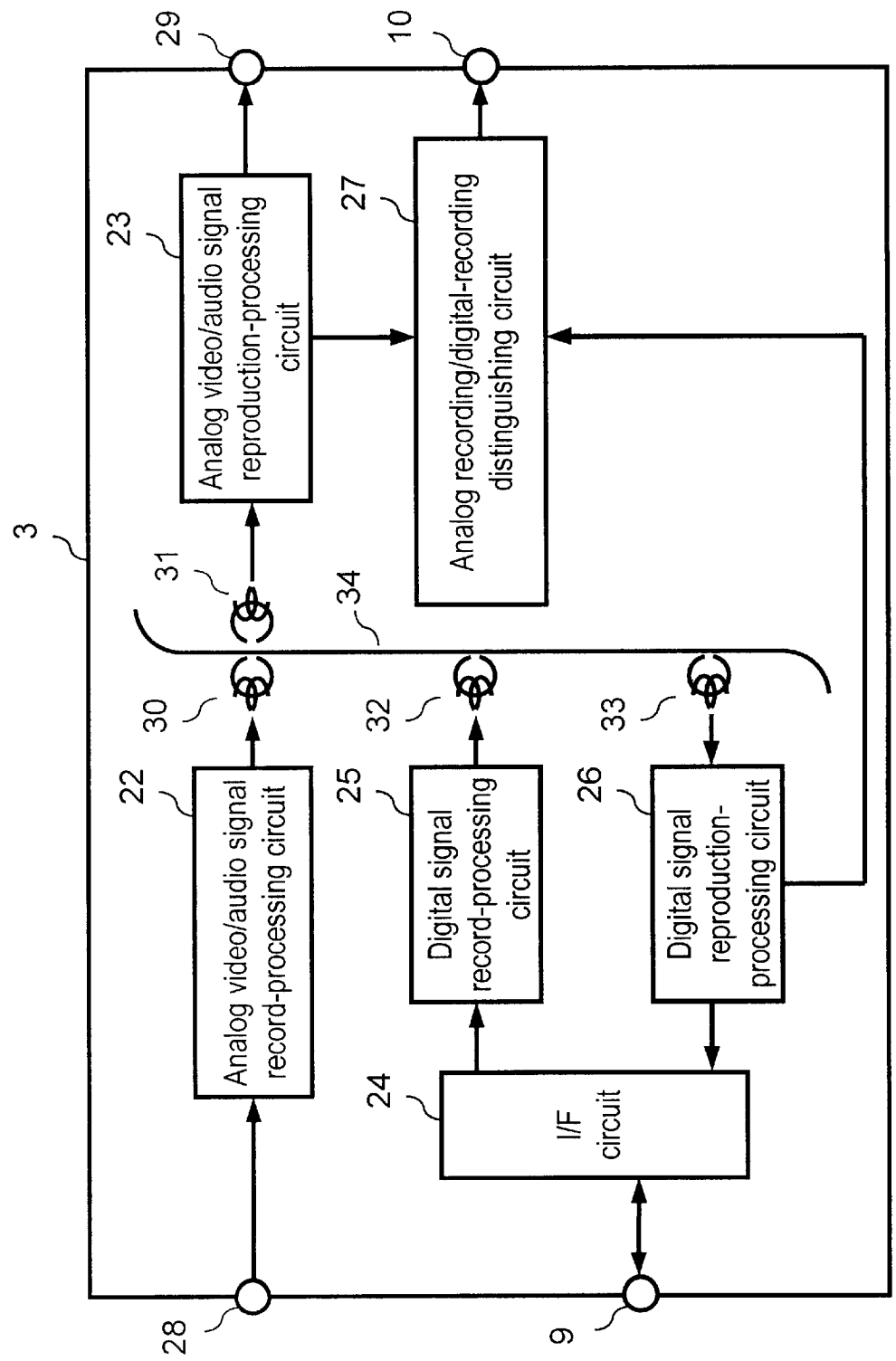
FIG. 3 is a block diagram depicting an internal structure of a recording and reproducing unit of the digital signal recording and reproducing apparatus of the present invention.
Figure 4:
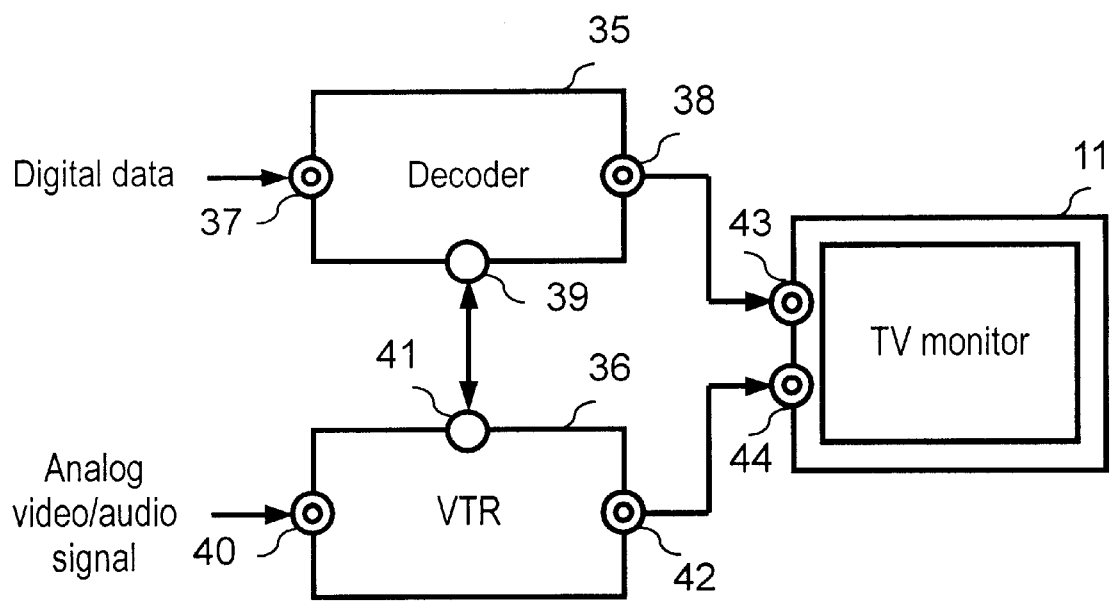
FIG. 4 is a block diagram of a conventional system for receiving and recording digital broadcasting.

The RF signal of a digital information signal fed in from an input terminal 20 is fed to a tuner 13, in FIG.2. The tuner 13 carries out a selection, demodulation, etc. of a digital information signal broadcasted by a specific transponder in the satellite broadcasting system. An error correction circuit 14 corrects an error generated upon the digital information signal during transmission. A descrambler 15 descrambles, according to a subscriber's information, etc. to convert into a signal which is decodable by a video/audio decoder 19 provided in a succeeding stage. In this connection, it is assumed that the received video/audio signal is a digital signal conforming to the MPEG2, etc. as an example.

A channel selection circuit 16 selects a specific digital information signal among a plurality of digital information signals containing information of images, sounds, etc., that are multiplexed within the same transponder. The channel selection circuit 16 outputs the selected digital information signal to an I/F circuit 17 and a switching circuit 18. The switching circuit 18 outputs a digital information signal to the video/audio decoder 19 by selecting either one of the digital information signal output directly by the channel selection circuit 16 and the digital information signal fed via the I/F circuit 17.

The I/F circuit 17 transmits a digital information signal such as a digital video/audio signal, etc. to the recording and reproducing unit 3 via the bus line 89 between the input/output terminals 8 and 9. The I/F circuit 17 converts the selected digital information signal into a signal compatible to a specification of the recording and reproducing unit 3, when recording the digital information signal. The I/F circuit 17 converts the digital signal fed from the recording and reproducing unit 3 into a signal decodable by the video/audio decoder 19, when reproducing the digital signal.

The recording and reproducing unit 3 is described next by referring to FIG. 3. First, an operation is described in the recording and reproducing unit 3, when an analog video/audio signal is fed from the outside.

When recording the analog video/audio signal, the analog video/audio signal fed through an input terminal 28 is fed to an analog video/audio signal record-processing circuit 22, and it is processed for recording with AGC, clamping, emphasizing, FM modulation, etc. in order to make it suitable for recording on a magnetic tape 34. Then a recording signal conforming to a specification of an analog recording method of the second recording format, the VHS format for example, is recorded on the magnetic tape 34 via a recording head 30.

A signal reproduced via a reproducing head 31 is fed to an analog video/audio signal reproduction-processing circuit 23, and an analog video/audio signal is output from an output terminal 29 after it is processed with FM demodulation, de-emphasizing, TBC, dropout correction, etc., when reproducing the analog video/audio signal. At the same time, an analog-recording/digital-recording distinguishing circuit 27 distinguishes the signal recorded on the magnetic tape 34 between analog and digital during the reproducing, and outputs a recording method identification signal to the selecting unit 4 as a switching control signal. Accordingly, the analog-recording/digital-recording distinguishing circuit 27 functions as a selecting unit control circuit.

The recording methods are distinguishable by detecting a difference in forwarding speeds of the magnetic tape and presence of a synchronizing signal with each recording method. It is also feasible by detecting a reproduction output, etc., from each of the magnetic heads, if a separate magnetic head is used for each recording method.

Described next is a case where a digital information signal received by the digital information decoding unit 2 is recorded in the recording medium, by referring to FIG. 2 and FIG. 3.

The input/output terminal 8 of the digital information decoding unit 2 and the input/output terminal 9 of the recording and reproducing unit 3 are connected with the bus line 89, so that the I/F circuit 17 of the digital information decoding unit 2 and the I/F circuit 24 of the recording and reproducing unit 3 mutually input and output the digital information signals to and from the bus line 89 via the input/output terminal 8 and the input/output terminal 9 respectively.

The digital information signal to be recorded and reproduced is fed to the I/F circuit 24 through the input/output terminals 8 and 9, and converted into a signal suitable for processing. The signal processed by the I/F circuit 24 is fed to a digital signal record-processing circuit 25, and it is processed for an addition of error correction code, addition of synchronizing signal, modulation, etc. in order to make it suitable for recording on a magnetic tape. The information signal is then recorded on the magnetic tape 34 in the first recording format with a recording head 32.

In case of reproducing the digital information signal, the signal reproduced by a reproducing head 33 is fed to a digital signal reproduction-processing circuit 26, and it is output to the I/F circuit 24, after processed for reproducing such as a reproduction equalization, PLL, detection of the synchronizing signal, a time-base correction, an error correction, etc. The I/F circuit 24 converts the reproduced digital information signal again into a signal that is feasible for the digital information decoding unit 2 to input. The I/F circuit 17 converts the digital signal fed from the recording and reproducing unit 3 via the bus line 89 into a signal feasible for decoding by the video/audio decoder 19. The information signal reproduced in this manner is decoded into an analog video/audio signal in the digital information decoding unit 2.

The connection with the TV monitor 11 can become a single line, as shown in FIG. 1, by selecting an output signal of the digital information decoding unit 2 and an output signal of the recording and reproducing unit 3 with the selecting unit 4, in the manner as described above, thereby allowing the TV monitor to be used to carry a single input terminal.

Also, a decoded digital signal only exists within the digital signal recording and reproducing apparatus 1, and it does not exit outside of the apparatus, so as not to require a terminal for supplying the digital signal to the outside. Accordingly, it can protect a copyright of the digital information signal.

Although the recording head and the reproducing head are separated both in the analog recording method and in the digital recording method, as has been described, a video/audio signal can be recorded and reproduced by using a common head for recording and reproduction. Moreover, the video/audio signal can be recorded and reproduced back by using a common head for the analog recording method and the digital recording method. Furthermore, although in the above description, an analog signal input from the outside is recorded in the analog format, the video/audio signal can be recorded and reproduced with a recording and reproduction circuit for digital recording such as the DVC. If this is the case, the part for recording and reproduction processing suitable for the digital recording can be commonly utilized, while requiring a process of compression.

As has been described, a digital signal recording and reproducing apparatus of the present invention realizes an enjoyment of receiving new services of the digital broadcasting, and also viewing a played-back program that is recorded in the existing analog recording method without switching an input of a TV monitor at each time, with an addition of a considerably simple structural element of a selecting unit.

Also, since a decoding function of a digital information signal and a recording and reproducing function are combined into one body, an interface between each blocks can be freely designed which can bring an is advantage of reducing a size of the circuit.

Moreover, it can protect a copyright of the digital information, because a decoded digital signal never exits outside of the digital signal recording and reproducing apparatus.

Reference Numerals:
1 Digital signal recording/reproducing apparatus
2 Digital information decoding unit
3 Recording/reproducing unit
4 Selecting unit
5, 6, 12, 20, 28 Input terminals
7, 10, 29 Output terminals
8, 9 Input/output terminals
11 TV monitor
13 Tuner
14 Error correction circuit
15 Descrambler
16 Channel selecting circuit
17 I/F circuit
18 Switching circuit
19 Video/audio decoder
22 Analog video/audio signal record-processing circuit
23 Analog video/audio signal reproduction-processing circuit
24 I/F circuit
25 Digital signal record-processing circuit
26 Digital-signal reproduction-processing circuit 27
27 Analog-recording/digital-recording distinguishing circuit
30, 32 Recording heads
31, 33 Reproducing heads
34 Magnetic tape
89 Bus line

What is claimed is:

1. A digital signal recording and reproducing apparatus comprising:

a digital information decoding unit for outputting (a) a received digital information signal by selecting a channel, and (b) a first analog signal by selecting and decoding one of said selected digital information signal, and a reproduced digital information signal of a recording medium;

a recording and reproducing unit for outputting a reproduced digital signal, including (a) a digital signal recording means for inputting and recording on said recording medium the digital information signal of the channel selected and output by said digital information decoding unit, (b) a digital signal reproduction means for reproducing the digital signal recorded on said recording medium, and (c) a first recording and reproduction means for recording and reproducing an externally input analog video/audio signal on said recording medium as a second analog signal, said recording and reproducing unit determining whether a signal reproduced from said recording medium is recorded by an analog recording method or not and outputting a recording method identification signal;

a bus line for transmitting (a) the digital information signal of the channel selected and output by said digital information decoding unit to the recording and reproducing unit, and (b) the digital information signal output by said recording and reproducing unit to said digital information decoding unit; and, selection unit for electrically selecting and outputting either one of (a) the first analog signal decoded by said digital information decoding unit and (b) the second analog signal reproduced by said recording and reproducing unit according to said recording method identification signal.

2. The digital signal recording and reproducing apparatus according to claim 1, further comprising a selecting unit control circuit for inputting the digital signal output by a second recording and reproduction means and the second analog signal reproduced by said first recording and reproduction means, distinguishing the signal recorded on said recording medium between an analog recording method and a digital recording method, and outputting said recording method identification signal to said selection unit.

3. The digital signal recording and reproducing apparatus according to claim 1 or claim 2, wherein the first recording and reproduction means of said recording and reproducing unit records and plays back an analog signal in one of VHS format and SVHS format.

4. The digital signal recording and reproducing apparatus according to claim 2, wherein the first recording and reproduction means of said recording and reproducing unit records and plays back an analog signal in one of VHS format and SVHS format.

5. The digital signal recording and reproducing apparatus according to claim 1 further comprising:

a common output terminal, and said selection unit is for electrically selecting and outputting via said common output terminal either one of (a) the first analog signal decoded by said digital information decoding unit and (b) the second analog signal reproduced by said recording and reproducing unit.

6. The digital signal recording and reproducing apparatus according to claim 1, wherein said selection unit outputs the first analog signal if the signal reproduced from said recording medium is recorded by the analog recording method and, wherein said selection unit outputs the second analog signal if the signal reproduced from said recording medium is not recorded by the analog recording method.

* * * * *

UNITED STATES PATENT AND TRADEMARK OFFICE
CERTIFICATE OF CORRECTION

PATENT NO. : 6,556,776 B1 Page 1 of 1
DATED : April 29, 2003
INVENTOR(S) : Ochi et al.

It is certified that error appears in the above-identified patent and that said Letters Patent is hereby corrected as shown below:

<u>Column 8,</u>
Line 38, delete "or claim 2".

Signed and Sealed this

Twentieth Day of January, 2004

JON W. DUDAS
*Acting Director of the United States Patent and Trademark Office*